(12) United States Patent
Sawada

(10) Patent No.: US 12,040,600 B2
(45) Date of Patent: Jul. 16, 2024

(54) FIXTURE MOUNTING STRUCTURE AND RESIN FIXTURE

(71) Applicant: DAIWA KASEI INDUSTRY CO., LTD., Okazaki (JP)

(72) Inventor: Naohiro Sawada, Okazaki (JP)

(73) Assignee: DAIWA KASEI INDUSTRY CO., LTD., Okazaki (JP)

( * ) Notice: Subject to any disclaimer, the term of this patent is extended or adjusted under 35 U.S.C. 154(b) by 6 days.

(21) Appl. No.: 18/054,268

(22) Filed: Nov. 10, 2022

(65) Prior Publication Data
US 2023/0208119 A1 Jun. 29, 2023

(30) Foreign Application Priority Data

Dec. 28, 2021 (JP) ................. 2021-214846

(51) Int. Cl.
*B60R 16/02* (2006.01)
*H02G 3/04* (2006.01)
(52) U.S. Cl.
CPC ................. *H02G 3/0456* (2013.01)
(58) Field of Classification Search
CPC ..... H02G 3/0456; H02G 3/30; B60R 16/0215
See application file for complete search history.

(56) References Cited

U.S. PATENT DOCUMENTS

| | | | | |
|---|---|---|---|---|
| 5,390,876 A * | 2/1995 | Hatano | ................. | F16L 3/1075 248/74.1 |
| 6,042,062 A * | 3/2000 | Sugiyama | ........... | B60R 16/0215 248/65 |
| 6,320,134 B1 * | 11/2001 | Rehberg | .............. | B60R 16/0215 174/135 |
| 7,128,514 B1 * | 10/2006 | Le Beau | ............. | F16B 37/0892 411/277 |
| 8,013,248 B2 * | 9/2011 | Sakata | .................. | H02G 3/0691 248/62 |
| 10,148,075 B2 * | 12/2018 | Loewe | ..................... | F16L 3/237 |
| 10,196,013 B2 * | 2/2019 | Pantino | ................. | F16L 3/1058 |
| 10,406,999 B2 * | 9/2019 | Ohashi | ................. | F16L 3/1075 |
| 11,015,742 B2 * | 5/2021 | Locatelli | .................. | H02G 3/32 |
| 2007/0231099 A1 * | 10/2007 | Bryant | ................. | H02G 3/0456 410/101 |
| 2018/0361960 A1 * | 12/2018 | Yamamoto | .......... | B60R 16/0215 |

(Continued)

FOREIGN PATENT DOCUMENTS

JP 3737187 B2 1/2006

*Primary Examiner* — Amy J. Sterling
(74) *Attorney, Agent, or Firm* — McClure, Qualey & Rodack, LLP

(57) ABSTRACT

Provided is a body portion that includes an insertion hole portion having an insertion hole as a long hole, and a placement portion which is adjacent to one side in an orthogonal direction of the insertion hole at an upper end side in the height direction of the body portion, and on which a long member can be placed. When an external force acts on the placement portion in the height direction, a biting phenomenon in which a protrusion of a main inner wall face of the body portion is pressed onto a main outer wall face of a columnar portion of the molded member is caused in the body portion based on a moment in which a fulcrum is a lower end side, in the height direction, which is an opposite side to the placement portion side, to prevent the body portion from being disengaged from the columnar portion.

13 Claims, 12 Drawing Sheets

(56) References Cited

U.S. PATENT DOCUMENTS

| | | |
|---|---|---|
| 2020/0180527 A1* | 6/2020 | Nishimura ............... H02G 3/30 |
| 2021/0328418 A1* | 10/2021 | Naganishi .............. H02G 3/263 |
| 2022/0032862 A1* | 2/2022 | Jang ................... B60R 16/0215 |
| 2023/0174002 A1* | 6/2023 | Sakurai ................... B60R 16/02 |
| | | 174/72 A |

* cited by examiner

FIXTURE MOUNTING STRUCTURE AND RESIN FIXTURE

RELATED APPLICATIONS

This application claims the priority of Japanese Patent Application No. 2021-214846 filed on Dec. 28, 2021. The disclosure of the prior application is hereby incorporated herein in the entirety by reference.

BACKGROUND OF THE INVENTION

Field of the Invention

This invention relates to a resin fixture for mounting a wire such as a wire harness to a molded member such as a vehicle instrument panel (instrument panel), and a mounting structure (fixture mounting structure) for mounting the resin fixture to a vehicle instrument panel (instrument panel) and the like.

Description of Related Art

To date, such a resin fixture has been fixed to a dedicated resin columnar portion disposed as a protrusion at an instrument panel, by using a mounting portion having thereinside a flat spring made of metal. The resin fixture is more firmly fixed by using the flat spring made of metal. Meanwhile, a wire harness is placed on a plate-like placement portion extending from the mounting portion in a predetermined direction, and bound and held together with the placement portion with a binding member such as tape.

However, in such a resin fixture, a flat spring made of metal is used, so that the number of components is increased and cost is also increased. Meanwhile, although Japanese Patent No. 3737187 discloses a clip, the shape of a columnar portion of an instrument panel has been complicated, and a simpler shape is required.

An object of this invention is to provide a resin fixture that can be firmly mounted to a molded member such as an instrument panel without using a metal component, and allows a columnar portion to which the resin fixture is to be mounted to have a simpler shape, and a fixture mounting structure for mounting the resin fixture to the columnar portion.

SUMMARY OF THE INVENTION

In order to attain the aforementioned object, a fixture mounting structure according to this invention is a fixture mounting structure for mounting a resin fixture for holding a counterpart component such as a wire harness, to a molded member such as an instrument panel, in which the resin fixture includes a body portion having a predetermined height in a protruding direction of a columnar portion, the body portion including an insertion hole portion in which a long hole having a rectangular cross-section, an ellipsoidal cross-section, or the like is formed along the protruding direction, in order to insert the columnar portion which is formed in a plate-like shape and which protrudes from a surface of the molded member, and a placement portion disposed adjacent to the body portion on one side in a transverse direction of the long hole at a termination side in the protruding direction of the body portion, the placement portion being integrated with the body portion, having a thickness less than a height of the body portion, and allowing the counterpart component to be placed on the placement portion, and in an insertion hole portion of the body portion, a protrusion that engages with the columnar portion of the molded member is formed on a main inner wall face on a side on which the placement portion is disposed, among two inner wall faces opposing each other in the transverse direction, and the protrusion protrudes toward a main outer wall face, of the columnar portion, opposing the main inner wall face.

In the-above-described configuration, when an external force acts on the placement portion in the protruding direction, a biting phenomenon in which the protrusion of the main inner wall face is pressed onto the main outer wall face is caused in the body portion based on a moment in which a fulcrum is a start end side, in the protruding direction, which is an opposite side to the placement portion side, to prevent the insertion hole portion of the body portion from being disengaged from the columnar portion of the molded member.

Specifically, in the above-described configuration, when an external force acts on the resin fixture in a direction of disengagement from the columnar portion, a higher force acts on the placement portion side on which a long member (counterpart component) such as a wire harness that is a heavy object is placed and held. As a result, the fulcrum is set in the resin fixture on the body portion side that is opposite to the placement portion side, and the entirety of the resin fixture is displaced so as to be lifted by rotating the placement portion side portion around the fulcrum. In the resin fixture having the above-described configuration, the protrusion of the insertion hole portion is pressed onto the columnar portion due to this displacement, so that the columnar portion can be assuredly prevented from being removed from the insertion hole portion. In this configuration, as long as the columnar portion has such a height as to allow the protrusion to be pressed onto the columnar portion, the columnar portion can be made small by reducing a height as compared with a conventional art. No metal component is used for the resin fixture having the above-described configuration, and the resin fixture is entirely formed as a resin injection-molded product, so that cost can be reduced. Furthermore, for the resin fixture having the above-described configuration, the columnar portion need not have a particular shape, and can be formed in, for example, a simple plate-like shape. Even when the columnar portion is shaped so as to have a rib (projection described below, or the like) on a plate-like main surface, since the main portion has a simple plate-like shape, the shape is not substantially complicated due to the rib.

The protrusion can be disposed in the insertion hole portion on a start end side (closer to the start end in the protruding direction than the center in the height direction is) in the protruding direction. In this configuration, the protrusion can be easily pressed onto the columnar portion.

One or more auxiliary grooves that fit to projections formed on the main outer wall face of the columnar portion so as to project can be formed in the main inner wall face of the insertion hole portion along the protruding direction, and the protrusion can be formed so as to protrude from the auxiliary groove toward the corresponding projection. In this configuration, the protrusion is pressed onto the projection, and can thus be more assuredly pressed onto the plate-like portion. In a case where the auxiliary groove is disposed, when the columnar portion is inserted in the insertion hole portion, the protrusion can be positioned so as to be assuredly pressed onto the projection.

The protrusion can be formed so as to protrude from the main inner wall face toward the projection such that the biting phenomenon in which the protrusion is pressed onto the projection formed on the main outer wall face of the columnar portion so as to project is caused. In this configuration, the projection onto which the protrusion can be easily pressed is formed on the columnar portion, thereby facilitating pressing of the protrusion.

An inner-side displacement preventing portion that adjacently opposes or comes into contact with the projection in a longitudinal direction of the long hole can be formed on the main inner wall face of the insertion hole portion. In this configuration, in the mounted state where the insertion hole portion of the body portion is engaged with the columnar portion of the molded member, displacement in the longitudinal direction can be prevented.

The inner-side displacement preventing portion may be formed so as to protrude from the main inner wall face of the insertion hole portion or may be formed so as to be recessed therefrom. For example, the auxiliary groove can act as the inner-side displacement preventing portion.

A lateral outer wall face positioned in a longitudinal direction of the long hole among outer wall faces of the body portion can adjacently oppose or come into contact with an outer-side displacement preventing portion formed on the main outer wall face of the columnar portion so as to protrude, in the longitudinal direction. In this configuration, in the mounted state where the insertion hole portion of the body portion is engaged with the columnar portion of the molded member, displacement in the longitudinal direction can be prevented.

The protrusion can be formed so as to protrude and extend in a longitudinal direction on the main inner wall face such that the biting phenomenon occurs in a tilted projection (projection) that projects on the columnar portion and extends so as to be tilted relative to the protruding direction toward the longitudinal direction of the long hole. In this configuration, since the protrusion is formed so as to be elongated in the longitudinal direction with respect to the tilted projection that is tilted relative to the protruding direction toward the longitudinal direction and that diagonally extends, when the body portion is engaged with the columnar portion of the molded member, a state where, for example, the protrusion does not reach the pressing position or the protrusion passes beyond the pressing position is prevented, and the pressing can be assured.

The body portion can have a fulcrum portion that comes into contact with a terminating protrusion protruding in the protruding direction from a terminating end in the protruding direction of the columnar portion of the molded member, on one or both of one side in the longitudinal direction of the long hole and a start end side in the protruding direction, and another side portion of the resin fixture in the longitudinal direction can be rotated toward the start end side in the protruding direction in a state where a contact state is maintained, to insert the columnar portion in the insertion hole portion and obtain the mounted state. In this configuration, merely by pressing the resin fixture against the terminating protrusion, and causing rotation around the pressed position as the fulcrum, the insertion hole portion of the body portion can be easily engaged with the columnar portion of the molded member.

The body portion can have a moderation feeling generating portion formed on the main inner wall face so as to protrude, and the moderation feeling generating portion can generate insertion moderation feeling by moving over the tilted projection, at a position immediately preceding a position at which insertion is completed, when the columnar portion is inserted in the insertion hole portion. In this configuration, a person who performs the mounting operation can be easily informed of completion of the mounting. Particularly, in a case where the protrusion is formed so as to be elongated in the longitudinal direction with respect to the tilted projection that is tilted relative to the protruding direction toward the longitudinal direction and that diagonally extends, since it is difficult to know completion of the mounting, this configuration is advantageous in that the person can know the completion of the mounting.

The placement portion can be formed on each of a first side and a second side that is opposite to the first side in the transverse direction of the long hole relative to the body portion on a termination side in the protruding direction of the body portion, and the columnar portion can be formed so as to correspond to the placement portion disposed on each of the first side and the second side that is opposite to the first side in the transverse direction. In this case, for example, the placement portions on the first side and the second side are integrated with the body portion so as to extend like a band along the transverse direction, and the long member as the counterpart component can be placed over the placement portions along the transverse direction. For example, in a case where an external force is applied to the long member disposed over the two placement portions and bound and held at the placement portions, so as to lift one of the placement portion side portion or the other of the placement portion side portion, or in a case where an external force (vibration or the like) is applied to the long member so as to alternately lift both the placement portions, the above-described biting phenomenon occurs, and the insertion hole portion of the body portion can be prevented from being disengaged from the columnar portion of the molded member.

Furthermore, the above-described resin fixture can be structured so as to prevent the insertion hole portion of the body portion from being disengaged from the columnar portion of the molded member, due to occurrence of the biting phenomenon.

DESCRIPTION OF THE PREFERRED EMBODIMENTS

An embodiment of this invention will be described below with reference to the drawings.

Figure 1:
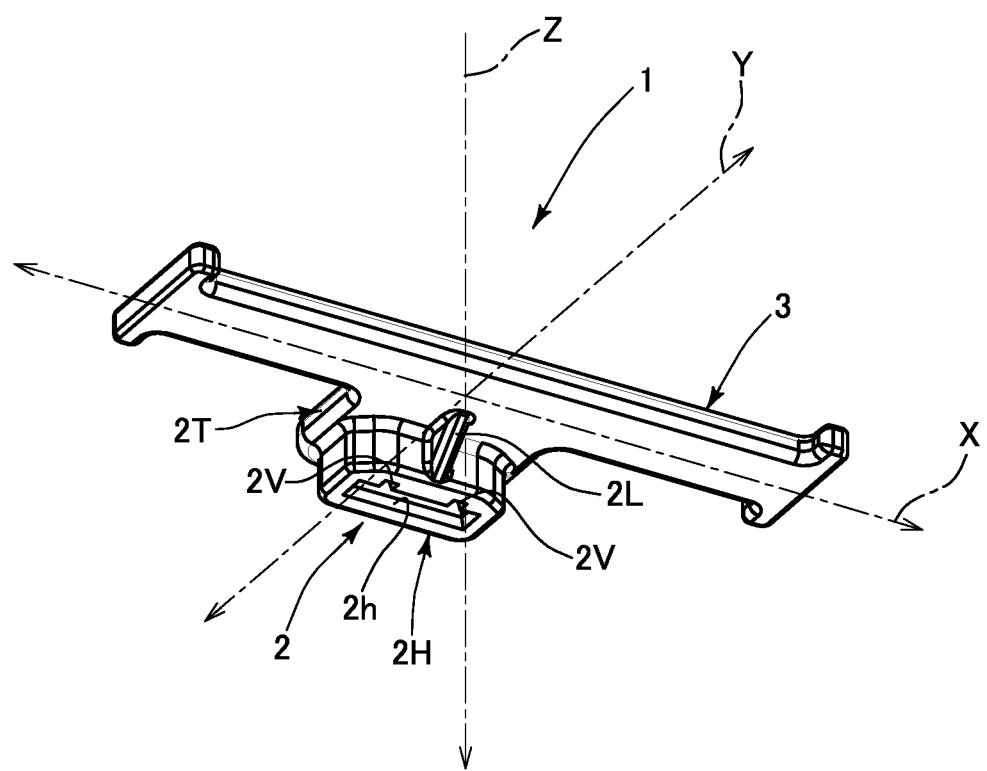
FIG. 1 is a perspective view of an example of a resin fixture according to this invention.
Figure 2:
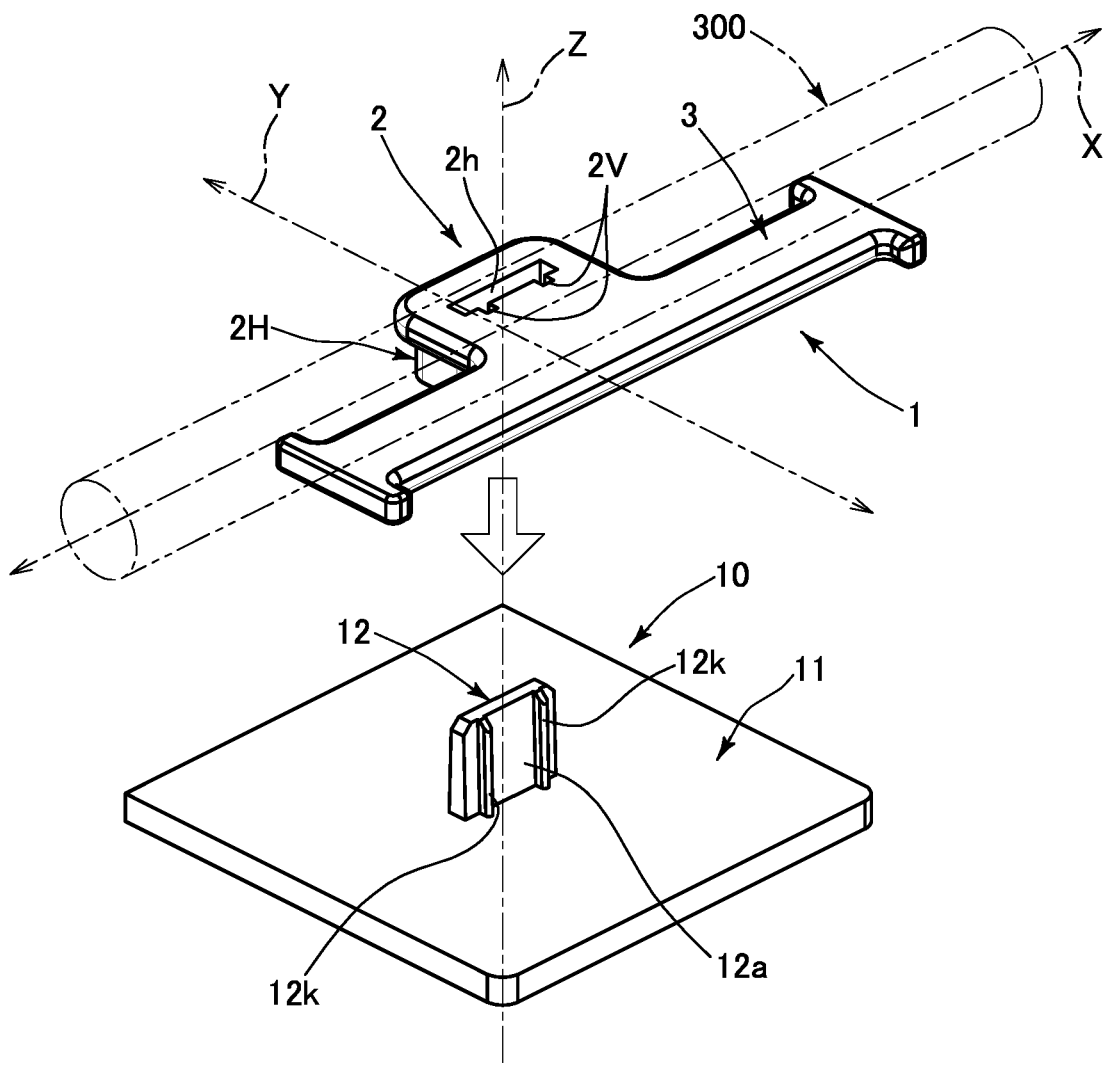
FIG. 2 is a perspective view of the resin fixture that has not been mounted to a molded member.
Figure 3:
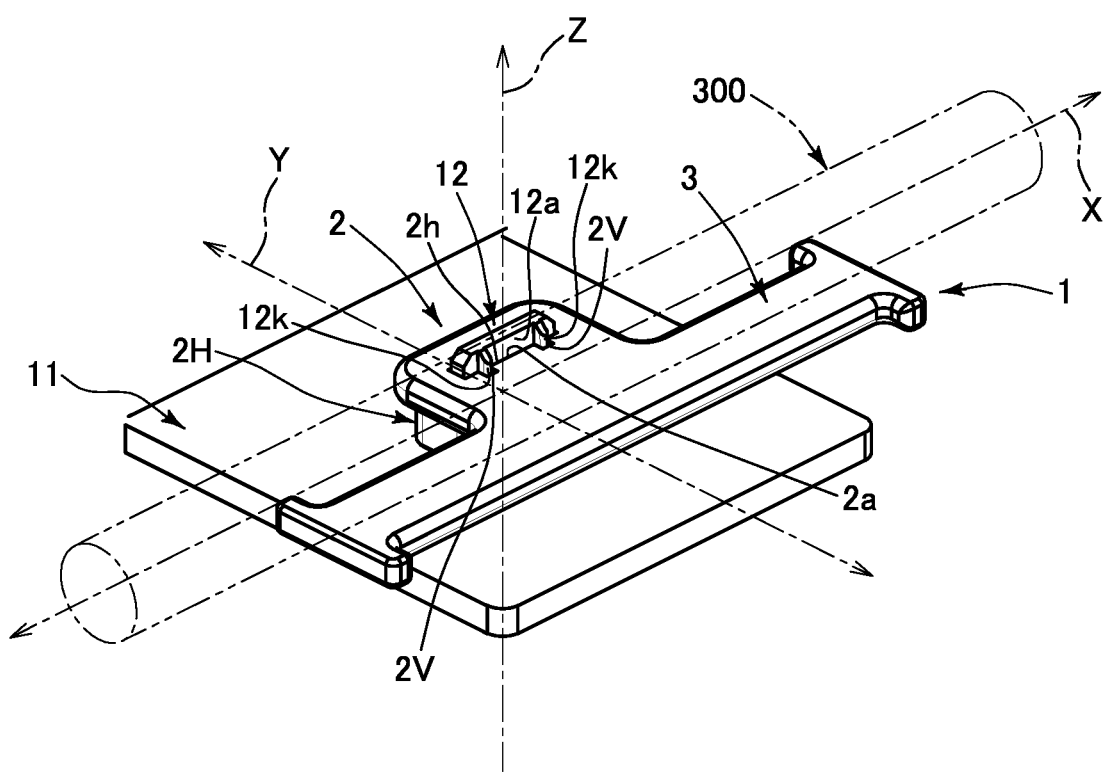
FIG. 3 is a perspective view of a mounting structure for mounting the resin fixture to the molded member.

A resin fixture 1 of the present embodiment is a resin component which is fixed to a molded member 10 (base member) such as an instrument panel and which holds a long member 300 (counterpart component) such as a wire harness, as shown in FIG. 1 to FIG. 3. In the description herein, the resin fixture 1 is formed as a resin injection-molded product. The resin fixture 1 includes a body portion 2 having an insertion hole portion 2H, and a placement portion 3 on which the long member 300 can be placed. The resin fixture 1 is mounted to the molded member 10 by inserting a columnar portion 12 formed as a protrusion at the molded member 10, in an insertion hole 2h of the insertion hole portion 2H, to form a fixture mounting structure 100 (see FIG. 4).

The resin fixture 1 is a resin component made of a resin material (single resin material in the description herein) such as polyacetal (POM), and has hardness higher than a resin material (for example, polypropylene) of the molded member 10. The columnar portion 12 of the molded member 10 is a plate-like portion that protrudes from a surface of a plate-like portion 11 of the molded member 10.

The plate-like columnar portion of this invention is not limited to a flat-plate-shaped portion as in the present embodiment, and may have a shape in which the plate width direction orthogonal to a protruding direction Z can be set as a longitudinal direction X, and the plate thickness direction can be set as a transverse direction Y. For example, examples of the shape of the plate-like columnar portion include a shape protruding such that a cross-section taken along a plane formed by the protruding direction Z, and the transverse direction Y corresponding to the plate thickness direction, is a triangular cross-section or a trapezoidal cross-section in which the thickness is reduced toward the protruding end side.

The insertion hole portion 2H has a predetermined height in the protruding direction Z of the columnar portion 12, and has the insertion hole 2h formed in the protruding direction Z (hereinafter, also referred to as the height direction Z) in order to insert the columnar portion 12 protruding from the surface of the molded member 10. In the insertion hole portion 2H, the columnar portion 12 is received by the insertion hole 2h. In the description herein, the insertion hole 2h is formed as a long hole having a rectangular cross-section, an ellipsoidal cross-section, or the like. Furthermore, in the description herein, the insertion hole 2h is a through hole formed so as to penetrate in the height direction Z. The insertion hole 2h may have a bottom, or a part of the outer peripheral portion surrounding the insertion hole 2h may be removed.

The placement portion 3 is integrated with the body portion 2 on the upper end side (termination side/protruding end side in the protruding direction Z of the columnar portion 12), in the height direction Z, of the body portion 2 so as to be adjacent to one side (in this case, any one side in the transverse direction Y of the columnar portion 12. Hereinafter, also referred to as orthogonal direction Y.) of the body portion 2 in a predetermined orthogonal direction orthogonal to the height direction Z, and the long member 300 can be placed on the placement portion 3 at the one side. In the present embodiment, the placement portion 3 is integrated with the body portion 2 so as to be adjacent to the one side in the orthogonal direction Y on the upper end side, in the height direction Z, of the body portion 2, and extend like a band along a direction (in this case, the longitudinal direction X of the columnar portion 12. Hereinafter, also referred to as orthogonal direction X) orthogonal to both the height direction Z and the orthogonal direction Y, and the long member 300 can be placed along the orthogonal direction X. In the present embodiment, the placement portion 3 has a thickness less than the height of the body portion 2, and a triangular rib 2L (see FIG. 1) is formed on the lower side, in the height direction Z, of the placement portion 3 so as to protrude from the outer peripheral side surface of the insertion hole portion 2H and connect to the lower surface of the placement portion 3.

The long member 300 (see FIG. 2 and FIG. 3) such as a wire harness is placed on the upper surface of the placement portion 3 along the orthogonal direction X, and is bound together with the placement portion 3 (in this case, both end portions, in the orthogonal direction X, of the placement portion 3) with a binding member (not shown) such as a belt or tape, and is thus held on the placement portion 3. In this invention, the counterpart component is not limited to the long member 300.

Figure 4:
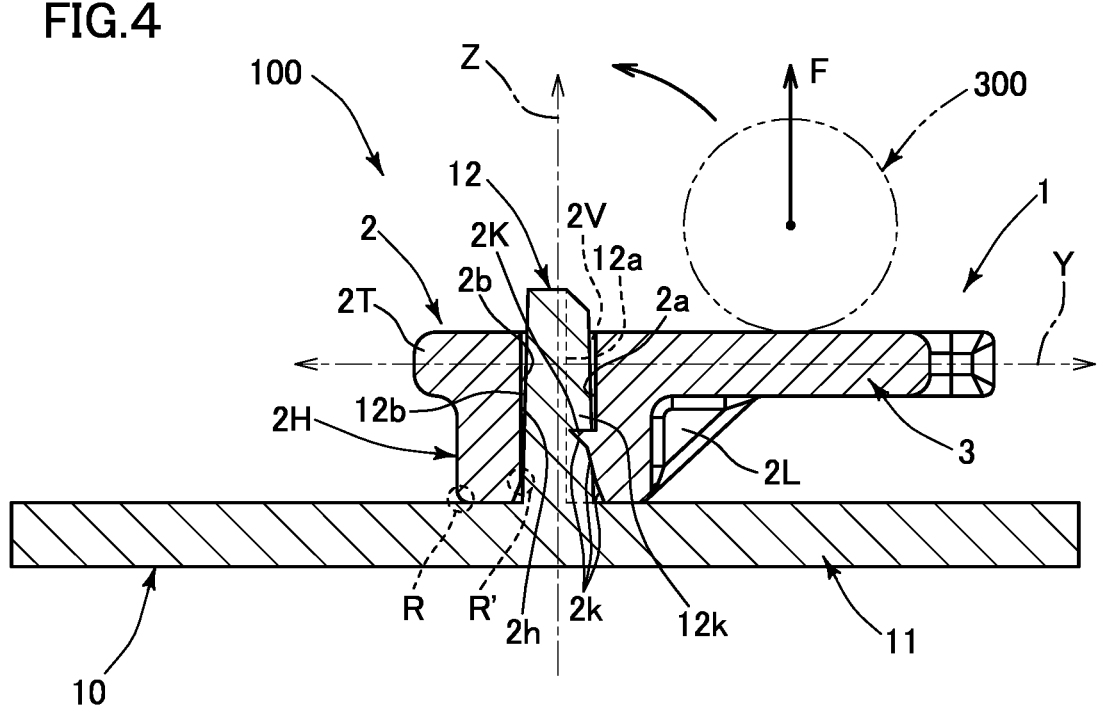
FIG. 4 is a cross-sectional view of a main portion of the mounting structure according to this invention.

In the insertion hole portion 2H, as shown in FIG. 4, a protrusion 2K (claw portion) for engaging with the columnar portion 12 of the molded member 10 is formed at a mid-portion, in the height direction Z, of a main inner wall face 2a on a side on which the placement portion 3 is disposed, among two inner wall faces 2a, 2b opposing each other in the orthogonal direction Y, and the protrusion 2K protrudes toward a main outer wall face 12a, of the columnar portion 12, opposing the main inner wall face 2a.

Thus, when an external force F acts on the placement portion 3 in the height direction Z, a biting phenomenon in which the protrusion 2K of the main inner wall face 2a is pressed onto the main outer wall face 12a occurs in the body portion 2, based on a moment in which a fulcrum R is the lower end side (start end side/base end side in the protruding direction Z of the columnar portion 12) in the height direction Z on a side opposite to the placement portion 3 side, and the insertion hole portion 2H of the body portion 2 is prevented from being disengaged from the columnar portion 12 of the molded member 10.

Specifically, a situation where the insertion hole portion 2H is lifted from the columnar portion 12 in the height direction Z in a state where the long member 300 is bound and held at the placement portion 3, is practically a situation where the force F higher than other forces acts, in the height direction Z, on the long member 300 that has a much greater weight than the entirety of the resin fixture 1. At this time, the force F acts in the height direction Z on the resin fixture 1 unevenly at the placement portion 3 side. As a result, the resin fixture 1 is displaced such that the fulcrum R is set in the insertion hole portion 2H on the opposite side (to the left of the protruding end position of the protrusion 2K in FIG. 4) to the placement portion 3 side at a position at which the insertion hole portion 2H is in contact with the molded member 10 on the lower end side, and the placement portion 3 side portion is lifted so as to rotate upward around the fulcrum R. Through the rotation, the protrusion 2K having hardness higher than the columnar portion 12 is pressed onto the columnar portion 12, so that the columnar portion 12 is prevented from being removed from the insertion hole portion 2H.

The columnar portion 12 has one or more deformable ribs 12k (projections: deformable projections, deformable columnar portions) projecting outward, on the main outer wall face 12a that is one of the outer wall faces 12a, 12b, as shown in FIG. 2 and FIG. 3, and the protrusion 2K is pressed onto the columnar portion 12 shown in FIG. 4 at the deformable rib 12k. In the description herein, one or more auxiliary grooves 2V into which the deformable ribs 12k formed as projections on the main outer wall face 12a of the columnar portion 12 fit, are formed in the main inner wall face 2a of the insertion hole portion 2H along the height direction Z, and the protrusion 2K is formed so as to protrude toward the corresponding deformable rib 12k from the auxiliary groove 2V. Thus, the columnar portion 12 is inserted in the insertion hole 2h by fitting the deformable ribs 12k into the auxiliary grooves 2V, so that the protrusion 2K in the auxiliary groove 2V is positioned to assuredly oppose the deformable rib 12k after the columnar portion 12 has been inserted, and the protrusion 2K can be assuredly pressed onto the deformable rib 12k disposed at the opposing position when the above-described rotation occurs.

In the description herein, a plurality (two in this case) of the auxiliary grooves 2V are aligned in the orthogonal direction X at the main inner wall face 2a of the insertion hole portion 2H, and the protrusion 2K is formed in each auxiliary groove 2V. Meanwhile, the deformable ribs 12k are formed at positions corresponding to the auxiliary grooves 2V, on the main outer wall face 12a of the columnar portion 12. Thus, since a plurality (two in this case) of portions onto which the protrusions 2K are pressed are formed on the main outer wall face 12a of the plate-shaped columnar portion 12 so as to be aligned in the longitudinal direction X (the orthogonal direction X), pressing is stabilized, so that the rotation of the entirety of the resin fixture 1 described above and disengagement of the insertion hole portion 2H from the columnar portion 12 during the rotation can be effectively prevented.

The deformable rib 12k enters the auxiliary groove 2V when the columnar portion 12 is inserted in the insertion hole 2h, and is deformed due to the protrusion 2K being pressed onto the deformable rib 12k. A mounted state (inserted and fixed state) in which both of the columnar portion 12 and the insertion hole portion 2H are fixed is obtained by the pressing. When, in this state, the external force F in the height direction Z is generated in the resin fixture 1, and the placement portion 3 side portion is lifted so as to rotate upward around the fulcrum R (see FIG. 4), the deformable rib 12k is further deformed by the protrusion 2K, and a disengagement-preventing fixed state can be more assuredly obtained.

In this invention, the deformable ribs 12k may not necessarily cause the inserted and fixed state when the columnar portion 12 has been inserted in the insertion hole 2h. A mounted state where the columnar portion 12 is merely inserted in the insertion hole 2h may be formed as long as, when the force F acts, the fulcrum R is set and the resin fixture 1 is displaced such that the placement portion 3 side portion on which the force F acts is lifted so as to rotate upward around the fulcrum R, to cause the biting phenomenon in which the protrusion 2K is pressed onto the columnar portion 12.

Figure 5:
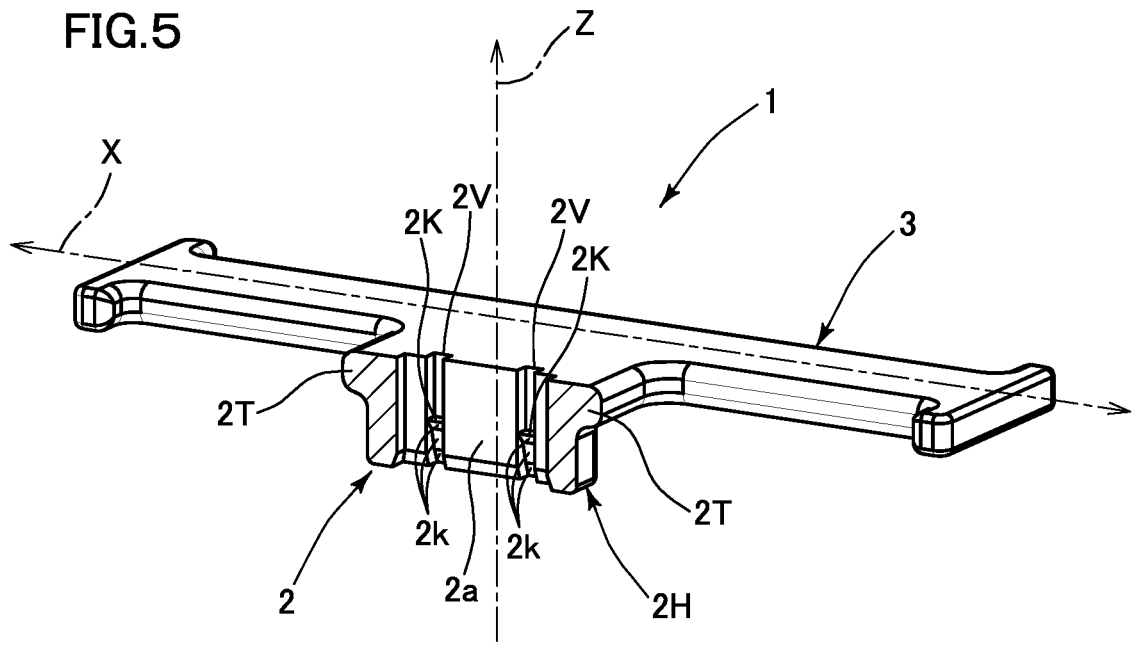
FIG. 5 is a cross-sectional view of an auxiliary groove in an insertion hole portion.
Figure 6:
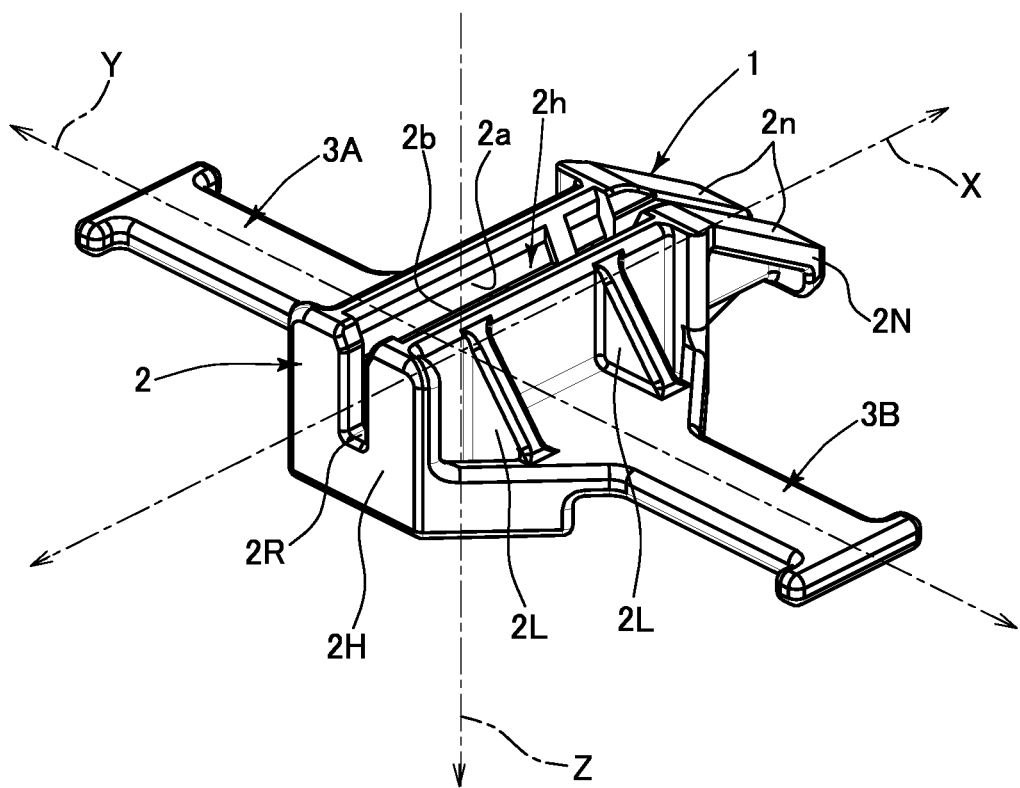
FIG. 6 is a perspective view of a resin fixture according to a modification of this invention.

The protrusion 2K is disposed on the lower end side (start end side in the protruding direction Z of the columnar portion 12) in the height direction Z on the main inner wall face 2a, as shown in FIG. 4 and FIG. 5. Specifically, the protrusion 2K is disposed closer to the lower end side in the height direction Z (start end side/protruding end side in the protruding direction Z of the columnar portion 12) than the center in the height direction Z is.

The protrusion 2K has, on the main inner wall face 2a, a tilted surface 2k disposed so as to be closer to the insertion hole 2h toward the upper side. The tilted surface 2k functions as a guide surface that allows the deformable rib 12k to easily enter the auxiliary groove 2V when the columnar portion 12 is inserted in the insertion hole 2h.

The body portion 2 has an annular flange portion 2T that protrudes outward, at an upper end portion of the insertion hole portion 2H that has a tubular shape in the height direction Z, as shown in FIG. 1, FIG. 4, and FIG. 5. The flange portion 2T is plate-shaped, has the same thickness as the placement portion 3, and is continuously formed.

Although one embodiment of this invention has been described above, the embodiment is merely illustrative. This invention is not limited to the embodiment, and various modifications such as additions and omissions may be made based on the knowledge of a person skilled in the art without departing from the gist of the claims.

Hereinafter, embodiments other than the above-described embodiment and modifications of the embodiments will be described. Portions having the same functions as those in the above-described embodiment are designated by the same reference characters and the detailed description thereof is omitted. In addition, the above-described embodiment and the following modifications and other embodiments may be combined to be implemented as appropriate as long as no technical contradiction arises.

For example, although, in the above-described embodiment, the lower end face of the insertion hole portion 2H comes into surface contact with the plate-like portion 11 disposed at the base end of the columnar portion 12 of the molded member 10, and the fulcrum position is thus the position indicated by the reference character R, the fulcrum position can be the position indicated by, for example, reference character R' depending on the shape of the body portion 2 or the columnar portion 12. Furthermore, such a fulcrum may be a position other than the above-described R, R', or the fulcrum position may be changed while the external force F acts. Such a fulcrum may be any contact position with the molded member 10 in a range that is on the opposite side (side closer to the other side in the orthogonal direction Y than the protruding end position of the protrusion 2K is) to the placement portion 3 side and is closer to the opposite side than at least the protrusion 2K in the insertion hole portion 2H is. Thus, the insertion hole portion 2H can be prevented from being disengaged from the columnar portion 12 due to the protrusion 2K being pressed onto the columnar portion 12.

In the above-described embodiment, the outer wall faces 12a, 12b as the front face and the back face of the columnar portion 12, and the inner wall faces 2a, 2b, of the insertion hole 2h, which oppose the outer wall faces 12a, 12b, respectively, are formed such that the opposing distances therebetween are increased upward in the height direction Z. Thus, the above-described fulcrum position (for example, reference character R, R') can be set so as to be lowered. In the description herein, the columnar portion 12 is tapered such that the width in the front-back direction is reduced upward. The opposing width between the inner wall faces 2*a* and 2*b* of the insertion hole 2*h* may be increased upward. In addition thereto, the columnar portion 12 may be tapered as described above.

In the above-described embodiment, when a force toward the height direction Z is generated in the resin fixture 1, and the placement portion 3 is lifted so as to rotate upward around the fulcrum R, the deformable rib 12*k* is deformed by the protrusion 2K. However, the deformable portion may not necessarily be the deformable rib 12*k*. For example, the deformable portion may not necessarily have a rib-like shape, and may be a protrusion that has another shape and protrudes from the main outer wall face 12*a*. Alternatively, the main outer wall face 12*a* may be directly deformed.

A modification obtained by applying the above-described embodiments will be described below with reference to FIG. 6 to FIG. 16.

In the resin fixture 1 according to the modification, as shown in FIG. 6 to FIG. 9, the body portion 2 including the insertion hole portion 2H is formed as in the above-described embodiment. The insertion hole portion 2H has the insertion hole 2*h* (long hole 2*h*) in which the columnar portion 12 protruding so as to have a plate-like shape is inserted and fixed, and the insertion hole 2*h* has a predetermined height in the protruding direction Z (the height direction Z of the body portion 2) of the columnar portion 12 which has been inserted and fixed, is long in the longitudinal direction X (the orthogonal direction X of the body portion 2) of the columnar portion 12, has a small width in the transverse direction Y (the orthogonal direction Y of the body portion 2), and has at least an opening (insertion opening for the columnar portion 12) on the start end side in the protruding direction Z. In the description herein, the insertion hole portion 2H is formed in a U-like shape having outer wall portions that oppose each other in the longitudinal direction X of the columnar portion 12. The U-shaped recess of the insertion hole portion 2H is the insertion hole 2*h*, and is opened also on the termination side in the protruding direction Z and penetrates. The insertion hole portion 2H has a termination-side connecting portion 2C connecting between both sides in the transverse direction Y so as to separate the opening of the insertion hole 2*h* in the transverse direction Y on the termination side in the protruding direction Z.

In the resin fixture 1, the placement portions 3A, 3B are formed relative to the body portion 2 on a first side and a second side opposite to the first side in the orthogonal direction Y, respectively, on the termination side in the height direction Z of the body portion 2. The columnar portion 12 is formed such that a first side in the transverse direction Y corresponds to the placement portion 3A and a second side opposite to the first side corresponds to the placement portion 3B in order to cause the same biting phenomenon as in the above-described embodiment. Hereinafter, the placement portion 3A is a first-side placement portion 3A adjacent to the body portion 2 on the first side in the orthogonal direction Y, and the placement portion 3B is a second-side placement portion 3B adjacent to the body portion 2 on the second side in the orthogonal direction Y. The first-side placement portion 3A and the second-side placement portion 3B are integrated with the body portion 2 so as to have a thickness less than the height of the body portion 2, and the long member 300 can be placed thereon.

Figure 10:
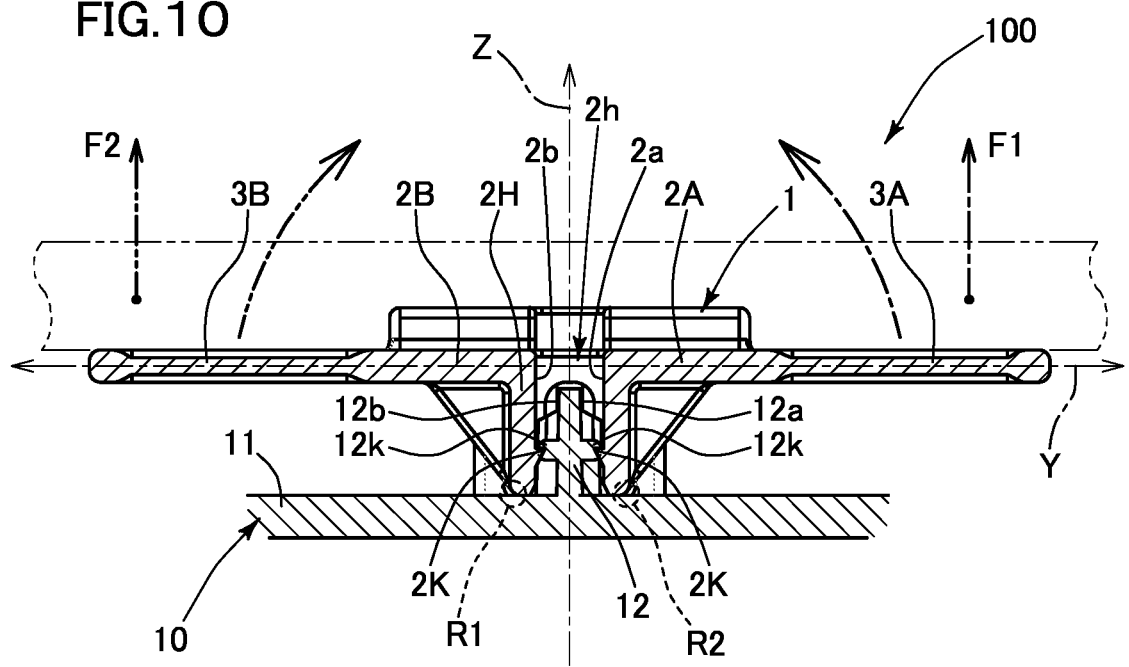
FIG. 10 is a cross-sectional view of a main portion of the mounting structure according to the modification.
Figure 11:
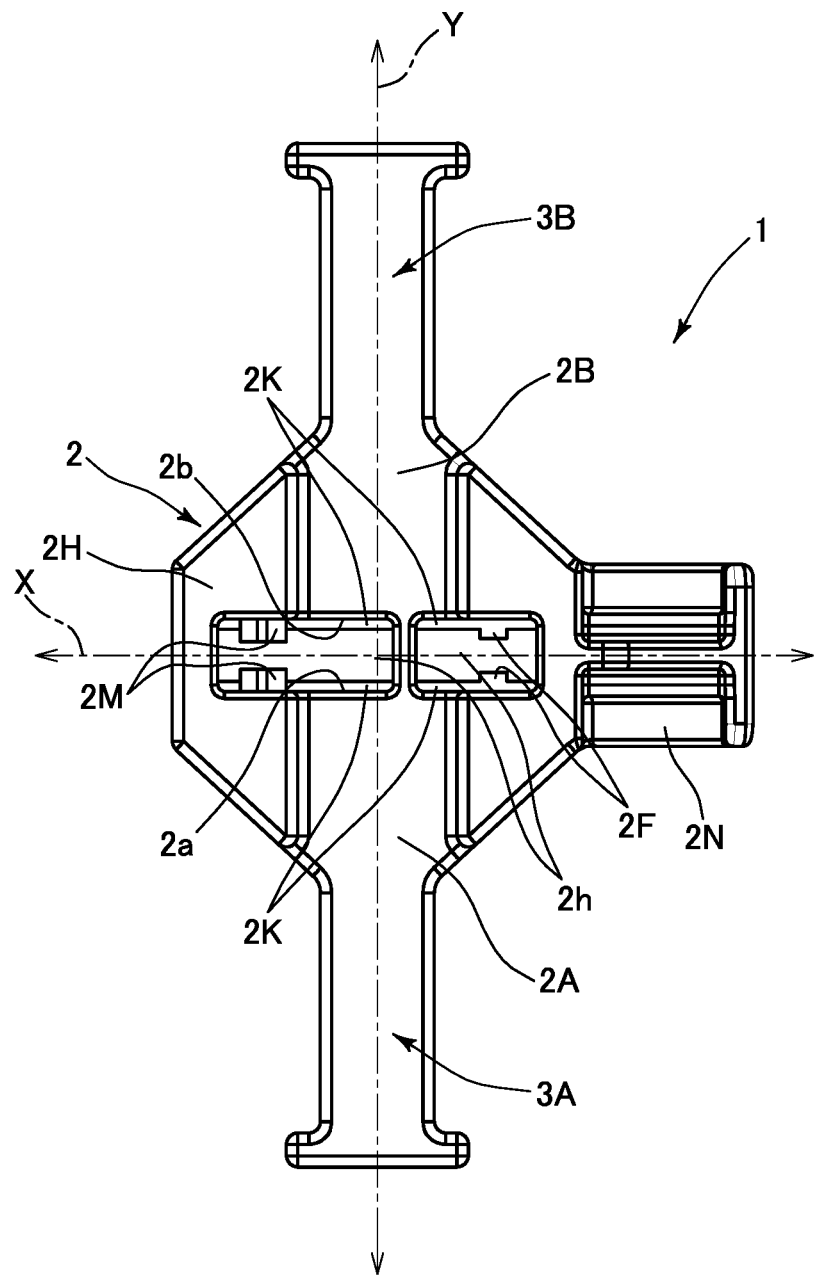
FIG. 11 is a plan view of the resin fixture according to the modification.

As shown in FIG. 10 and FIG. 11, in the insertion hole portion 2H of the body portion 2, among two inner wall faces 2*a*, 2*b* (hereinafter, also referred to as a first-side main inner wall face 2*a* and a second-side main inner wall face 2*b*) opposing each other in the orthogonal direction Y, the first-side main inner wall face 2*a* on the side on which the first-side placement portion 3A is disposed, has the protrusion 2K protruding toward the columnar portion 12 (specifically, toward the first-side main outer wall face 12*a* of the columnar portion 12) opposing the first-side main inner wall face 2*a*. Meanwhile, the second-side main inner wall face 2*b* on the side on which the second-side placement portion 3B is disposed, has the protrusion 2K protruding toward the columnar portion 12 (specifically, toward the second-side main outer wall face 12*b* of the columnar portion 12) opposing the second-side main inner wall face 2*b*.

In these configurations, in the fixture mounting structure 100, as shown in FIG. 10, when an external force F1 acts on the first-side placement portion 3A in the height direction Z, a biting phenomenon in which the protrusion 2K of the first-side main inner wall face 2*a* is pressed onto the columnar portion 12 (the first-side main outer wall face 12*a*) occurs in the body portion 2, based on a moment in which a fulcrum R1 is the start end side in the height direction Z on the side opposite to the first-side placement portion 3A side. Similarly, when an external force F2 acts on the second-side placement portion 3B in the height direction Z, a biting phenomenon in which the protrusion 2K of the second-side main inner wall face 2*b* is pressed onto the columnar portion 12 (the second-side main outer wall face 12*b*) occurs in the body portion 2, based on a moment in which a fulcrum R2 is the start end side in the height direction Z on the side opposite to the second-side placement portion 3B side. Thus, when an external force acts on one of the first-side placement portion 3A and the second-side placement portion 3B in the height direction Z, the insertion hole portion 2H of the body portion 2 is prevented from being disengaged from the columnar portion 12 of the molded member 10.

Figure 7:
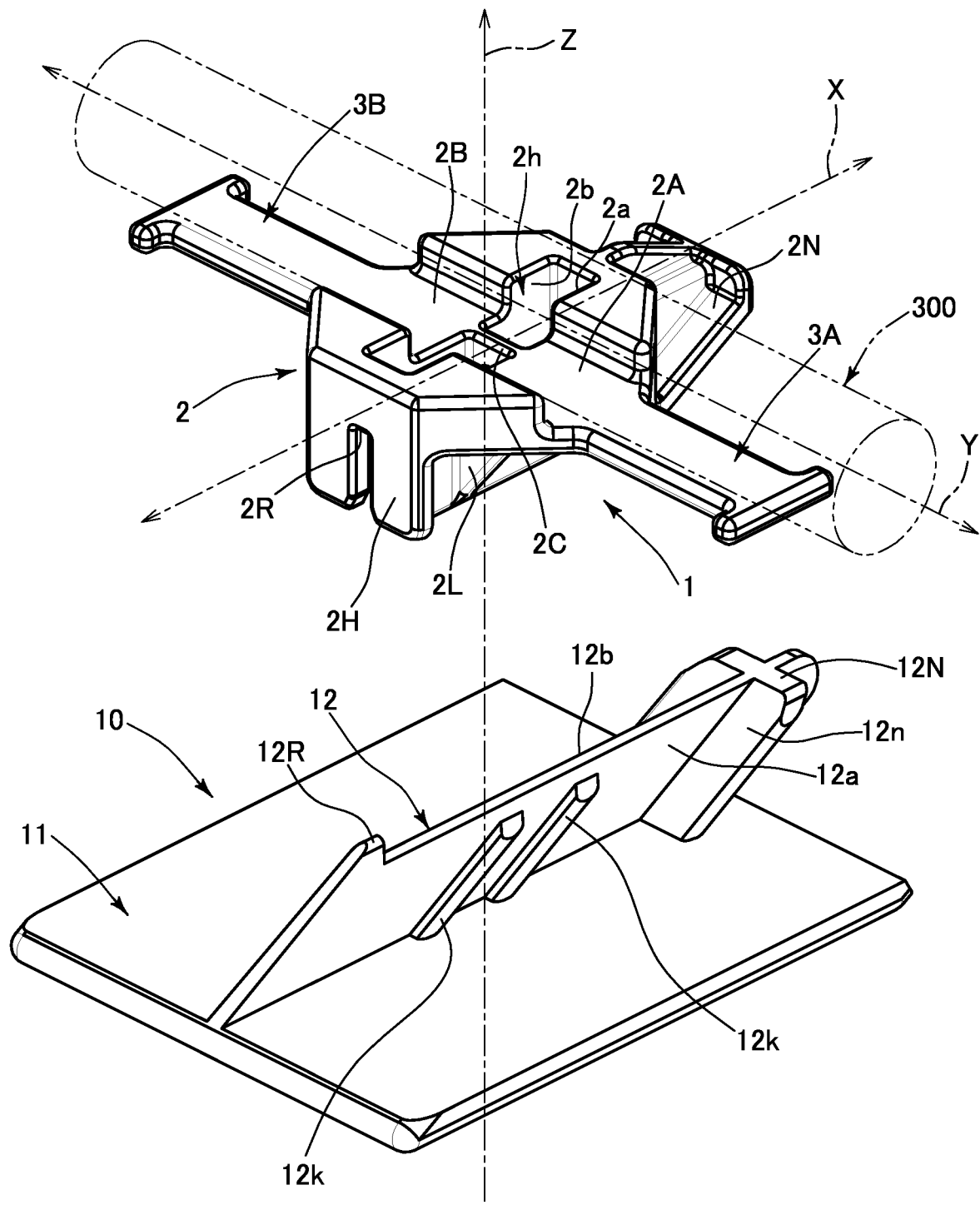
FIG. 7 is a perspective view of the resin fixture, according to the modification, which has not been mounted to a molded member.
Figure 8:
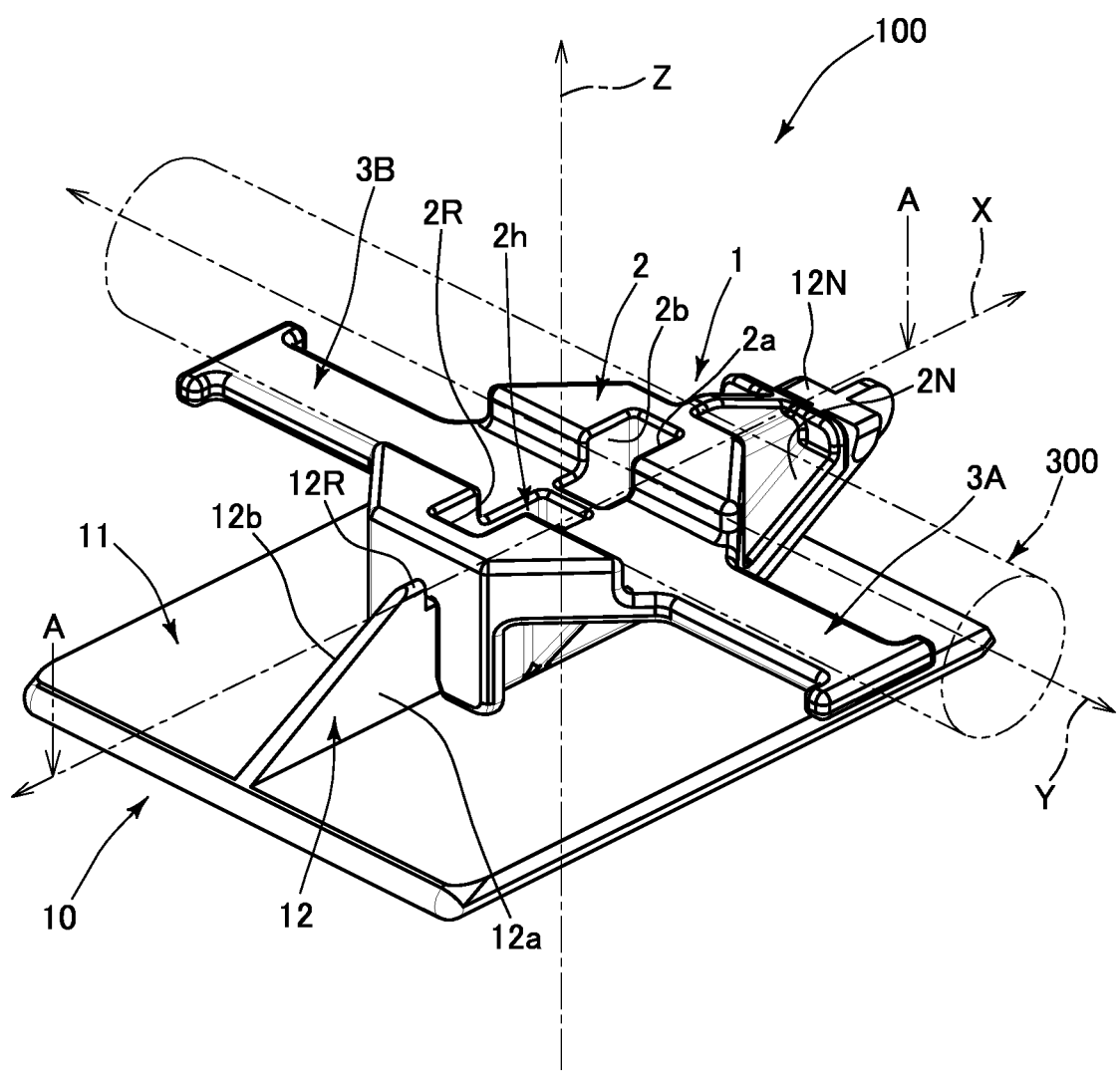
FIG. 8 is a perspective view of a mounting structure for mounting the resin fixture according to the modification to the molded member.

Specifically, as shown in FIG. 7 and FIG. 8, the first-side placement portion 3A and the second-side placement portion 3B are integrated with the body portion 2 so as to extend like a band along the orthogonal direction Y of the insertion hole 2*h* (long hole), and the long member 300 can be placed over the first-side placement portion 3A and the second-side placement portion 3B along the orthogonal direction Y. Furthermore, groove-shaped placement portions 2A, 2B extending in the orthogonal direction Y are formed on the termination side in the height direction Z of the insertion hole portion 2H so as to be recessed toward the start end side, and the long member 300 is linearly placed on the groove-shaped placement portions 2A, 2B, the termination-side connecting portion 2C described above, the first-side placement portion 3A, and the second-side placement portion 3B, and bound and held at the first-side placement portion 3A and the second-side placement portion 3B. In this state, in a case where, for example, an external force is applied to the long member 300 so as to lift the first-side placement portion 3A side portion or the second-side placement portion 3B side portion, or an external force (vibration or the like) is applied to the long member 300 so as to alternately lift the first-side placement portion 3A side portion and the second-side placement portion 3B side portion, occurrence of the biting phenomenon can prevent the insertion hole portion 2H of the body portion 2 from being disengaged from the columnar portion 12 of the molded member 10.

Figure 12:
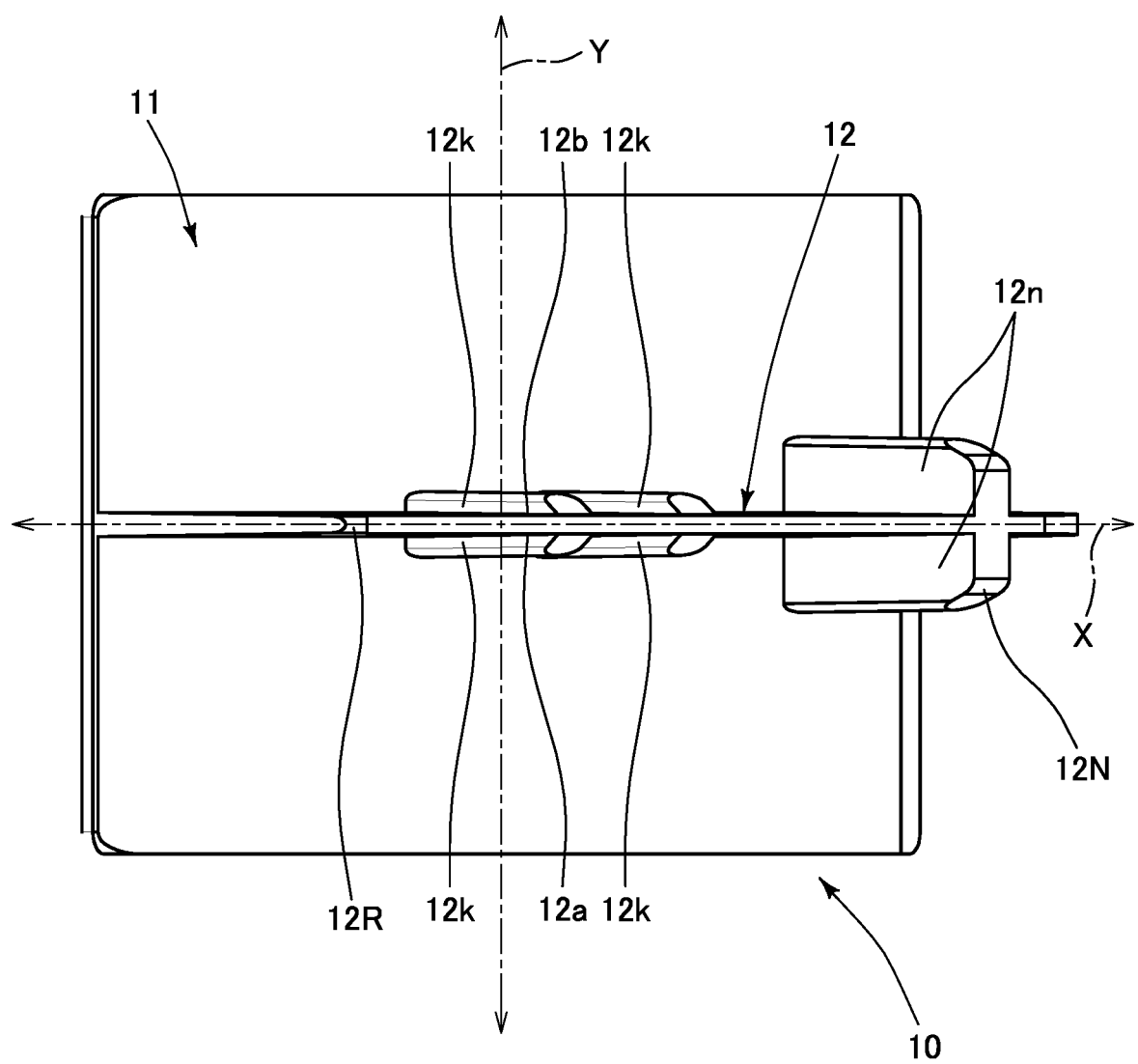
FIG. 12 is a plan view of the molded member used in the modification.

In the modification, as shown in FIG. 7 and FIG. 12, the columnar portion 12 has one or more deformable ribs 12*k*

(projections: deformable projections, deformable columnar portions) projecting outward, at each of the first-side main outer wall face 12a which is one of the outer wall faces 12a, 12b, and the second-side main outer wall face 12b disposed as the other thereof on the side opposite to the first-side main outer wall face 12a. Meanwhile, as shown in FIG. 10 and FIG. 11, the protrusion 2K formed on each of the first-side main inner wall face 2a and the second-side main inner wall face 2b protrudes from the main inner wall face 2a, 2b toward the corresponding main outer wall face 12a, 12b (the first-side main outer wall face 12a and the second-side main outer wall face 12b disposed as the other thereof on the opposite side) of the deformable rib 12k such that the biting phenomenon in the deformable rib 12k on the corresponding side occurs.

Figure 9:
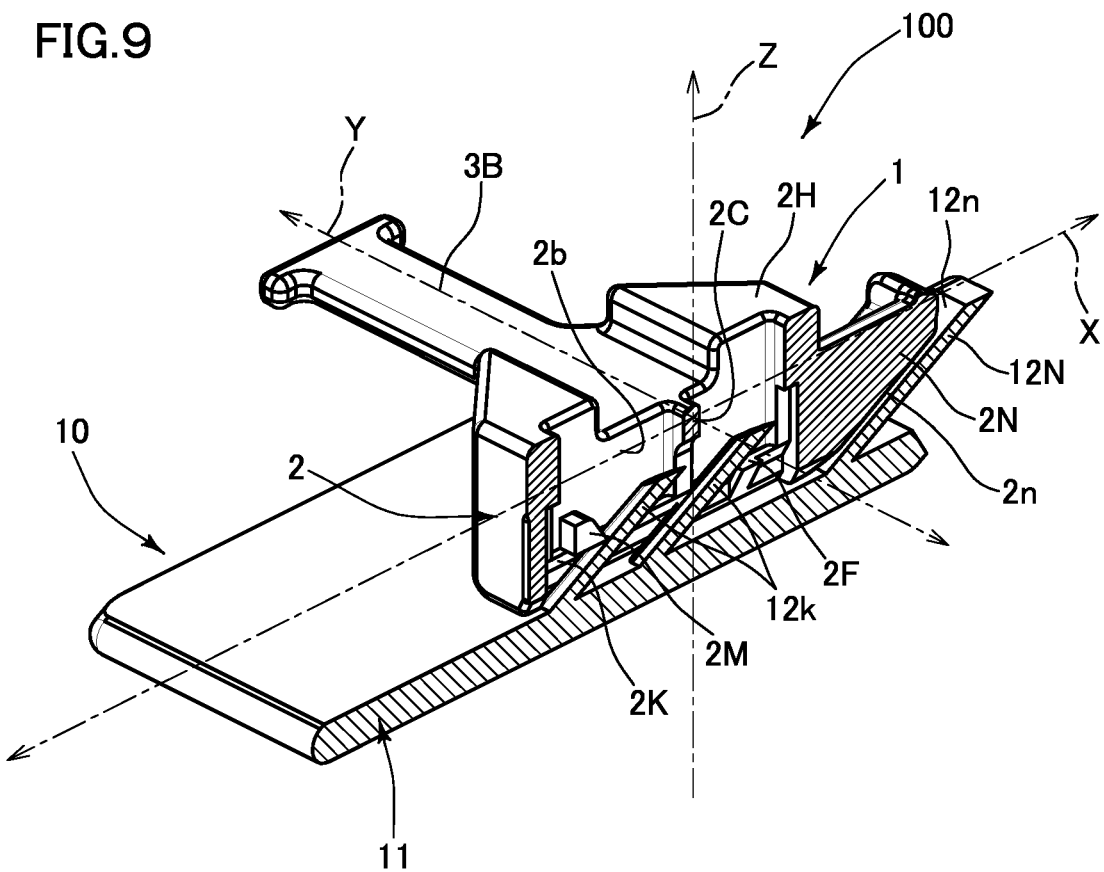
FIG. 9 is a cross-sectional view taken along a line A-A in FIG. 8.

In the modification, the deformable ribs 12k are tilted ribs (tilted projections, projections) formed on the first-side main outer wall face 12a and the second-side main outer wall face 12b so as to project, and extend so as to be tilted relative to the protruding direction Z toward the longitudinal direction X, as shown in FIG. 7 and FIG. 9. A plurality of the deformable ribs 12k that extend so as to be tilted are disposed on each of the first-side main outer wall face 12a and the second-side main outer wall face 12b, and extend linearly so as to be parallel to each other. Meanwhile, as shown in FIG. 9 and FIG. 11, the protrusion 2K protrudes so as to be elongated along the orthogonal direction X such that the biting phenomenon assuredly occurs in the deformable ribs 12k that project and extend so as to be tilted on each of the first-side main outer wall face 12a and the second-side main outer wall face 12b of the columnar portion 12.

The fixture mounting structure 100 has a displacement preventing portion that prevents the body portion 2 from being displaced from the columnar portion 12 in the orthogonal direction X in a mounted state where the insertion hole portion 2H of the body portion 2 is insertion-fixed to the columnar portion 12 of the molded member 10.

Specifically, as shown in FIG. 9 and FIG. 11, an inner-side displacement preventing portion 2M that adjacently opposes or comes into contact with the deformable rib 12k formed as a projection on the main outer wall face 12a, 12b of the columnar portion 12, on the first side in the orthogonal direction X, is formed so as to protrude on each of the first-side main inner wall face 2a and the second-side main inner wall face 2b of the body portion 2 (the insertion hole portion 2H). When the inner-side displacement preventing portion 2M comes into contact with the deformable rib 12k, the resin fixture 1 (the insertion hole portion 2H) in the above-described mounted state is prevented from being moved/displaced relative to the columnar portion 12 from the first side to the second side in the orthogonal direction X (second-direction displacement preventing portion).

Furthermore, as shown in FIG. 6 to FIG. 9, and FIG. 12, at the main outer wall face 12a, 12b of the columnar portion 12, an outer-side displacement preventing portion 12N that adjacently opposes or comes into contact with a lateral outer wall face 2n positioned on the second side that is opposite to the first side in the orthogonal direction X, among outer wall faces of the body portion 2, is formed in a plate-like shape so as to protrude. When the lateral outer wall face 2n comes into contact with the outer-side displacement preventing portion 12N, the resin fixture 1 (the insertion hole portion 2H) in the above-described mounted state is prevented from being moved/displaced relative to the columnar portion 12 from the first side to the second side in the orthogonal direction X (second-direction displacement preventing portion). In the description herein, the outer-side displacement preventing portion 12N is formed as a tilted surface which protrudes from the columnar portion 12 along the transverse direction Y and in which an opposing surface 12n that opposes the lateral outer wall face 2n is tilted similarly to the deformable rib 12k, and the lateral outer wall face 2n of the body portion 2 is also formed as a tilted surface corresponding thereto. In the description herein, the body portion 2 has a tilted end portion 2N having the lateral outer wall face 2n on the second side in the orthogonal direction X of the insertion hole portion 2H.

Figure 13:
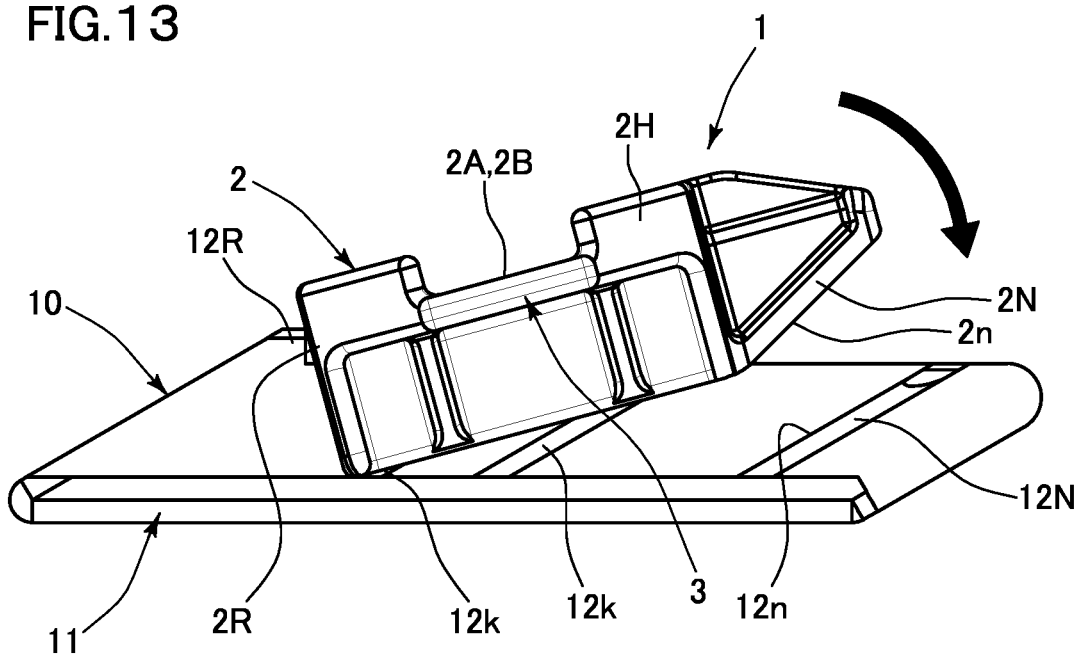
FIG. 13 is an explanatory diagram illustrating a procedure of mounting the mounting structure according to the modification as viewed from the side.
Figure 14:
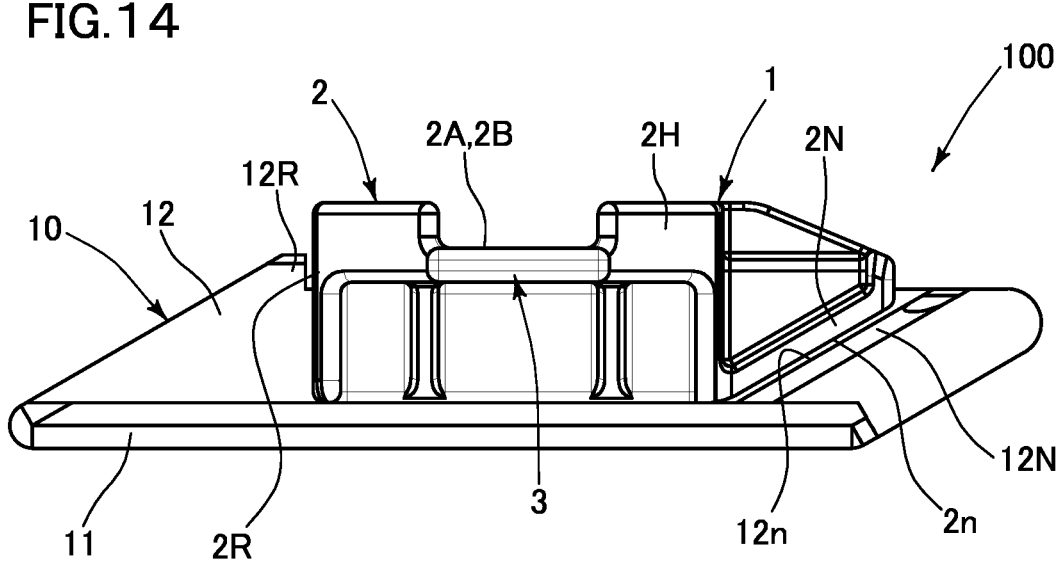
FIG. 14 shows a procedure subsequent to that in FIG. 13.

As shown in FIG. 7, FIG. 13, and FIG. 14, the body portion 2 has a fulcrum portion 2R that comes into contact with a terminating protrusion 12R that protrudes in the protruding direction Z from a terminating end in the protruding direction Z of the columnar portion 12 of the molded member 10 on the first side (one side) in the orthogonal direction X. In the description herein, the fulcrum portion 2R is an opening bottom surface peripheral portion of a U-shaped opening that faces the first side, among side end portions on the first side in the orthogonal direction X of the insertion hole portion 2H. In order to insert and fix the columnar portion 12 in the insertion hole portion 2H, the other side portion, in the orthogonal direction X, of the resin fixture 1 is rotated toward the start end side in the protruding direction Z in a tilted state where the contact state is maintained (FIG. 13→FIG. 14), and the columnar portion 12 is inserted in the insertion hole portion 2H, to form the fixture mounting structure 100 described above. In the fixture mounting structure 100, the protrusion 2K is pressed onto the deformable rib 12k, and the deformable rib 12k is deformed, thereby maintaining the mounted state (inserted and fixed state). Furthermore, when the fulcrum portion 2R of the body portion 2 comes into contact with the terminating protrusion 12R of the columnar portion 12, the resin fixture 1 (the insertion hole portion 2H) in the mounted state is prevented from being moved/displaced relative to the columnar portion 12 from the second side to the first side in the orthogonal direction X (first-direction displacement preventing portion). Also in the present embodiment, the mounted state where the columnar portion 12 is merely inserted in the insertion hole portion 2H, may be formed.

In this mounted state, since the protrusion 2K is pressed onto the deformable rib 12k (see FIG. 10), the resin fixture 1 is prevented from being disengaged in the height direction Z of the resin fixture 1, and is also prevented from moving in the orthogonal direction Y. The resin fixture 1 is also prevented from moving in the orthogonal direction X by engagement between the deformable rib 12k and the inner-side displacement preventing portion 2M on the first side in the orthogonal direction X (see FIG. 16), engagement between the outer-side displacement preventing portion 12N of the columnar portion 12 and the tilted end portion 2N (the lateral outer wall face 2n) on the second side, in the orthogonal direction X, which is opposite to the first side (see FIG. 9, FIG. 14, and FIG. 16), and engagement between the fulcrum portion 2R of the body portion 2 and the terminating protrusion 12R of the columnar portion 12.

Figure 15:
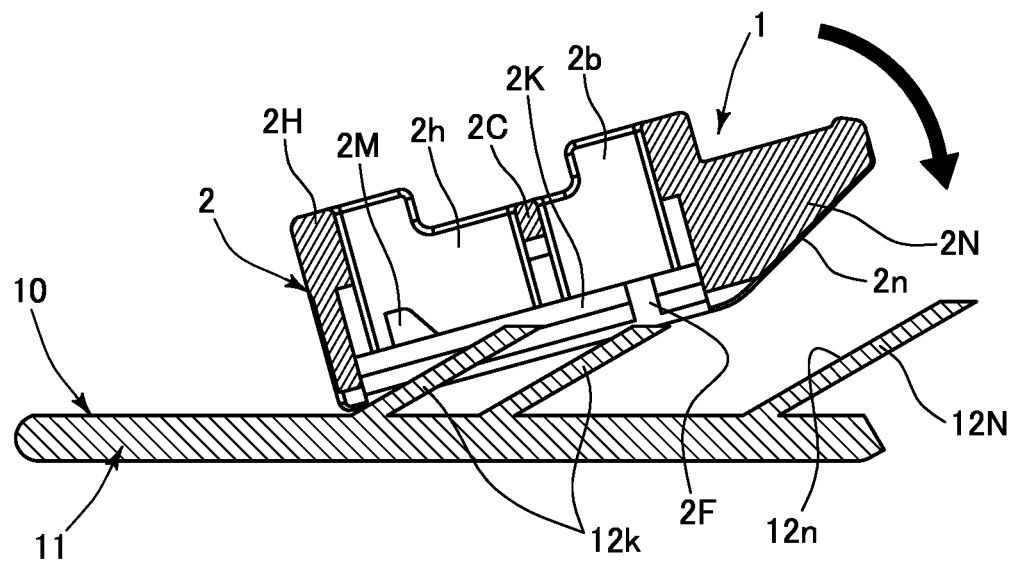
FIG. 15 is an explanatory diagram illustrating a procedure of mounting the mounting structure according to the modification as viewed on the cross-section.
Figure 16:
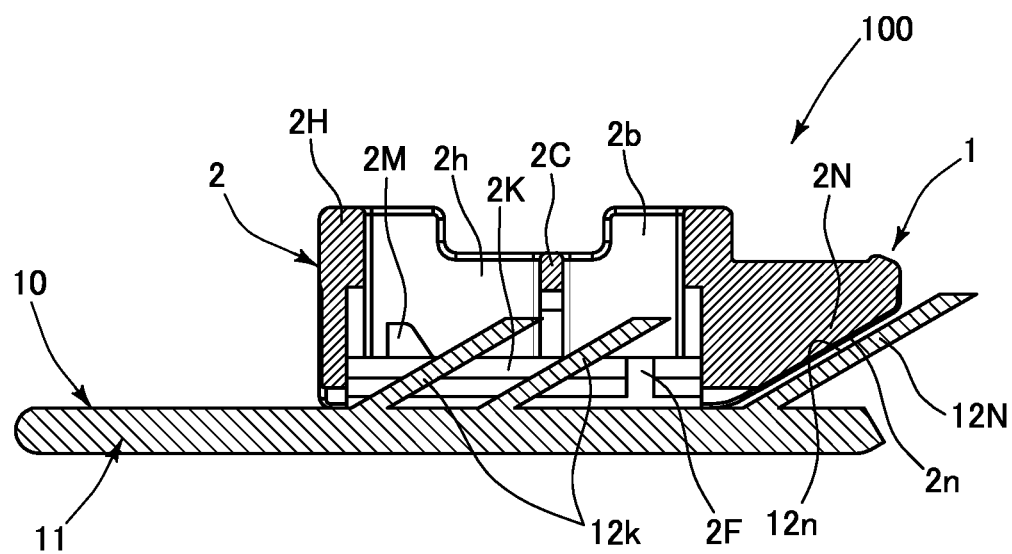
FIG. 16 shows a procedure subsequent to that in FIG. 15.

Furthermore, as shown in FIG. 15 and FIG. 16, the body portion 2 has a moderation feeling generating portion 2F formed on the main inner wall face 2a, 2b so as to protrude. The moderation feeling generating portion 2F generates insertion moderation feeling by moving over the deformable rib 12k that is formed as a projection on the main outer wall face 12a, 12b of the columnar portion 12 and that extends so as to be tilted relative to the protruding direction Z toward the longitudinal direction X, at a position immediately preceding a position at which the insertion and fixing are completed (position at which insertion is completed), when the columnar portion 12 is inserted and fixed in the insertion hole portion 2H, and can inform a user that the mounting has been completed. In the description herein, a plurality of the deformable ribs 12k are formed on each of the main outer wall faces 12a, 12b of the columnar portion 12, and one of the deformable ribs 12k moves over the moderation feeling generating portion 2F.

When the columnar portion 12 is inserted and fixed in the insertion hole portion 2H, if contact of the fulcrum portion 2R of the resin fixture 1 with the terminating protrusion 12R of the columnar portion 12 is released, the columnar portion 12 is continuously inserted in the insertion hole portion 2H from the termination side toward the start end in the protruding direction Z. In this case, the lateral outer wall face 2n, of the body portion 2, which is tilted from the second side to the first side in the longitudinal direction X toward the start end in the protruding direction Z, and the outer-side displacement preventing portion 12N of the columnar portion 12 come into contact with each other, and the insertion is continuously performed by sliding the lateral outer wall face 2n of the body portion 2 on the outer-side displacement preventing portion 12N of the columnar portion 12, and the deformable rib 12k is moved over the moderation feeling generating portion 2F to complete the mounting. That is, the insertion is continuously performed such that the lateral outer wall face 2n of the body portion 2 is guided by the outer-side displacement preventing portion 12N of the columnar portion 12, to complete the mounting.

In the fixture mounting structure 100 according to the modification, the columnar portion 12 and the resin fixture 1 are formed so as to be symmetrical in the transverse direction Y (the orthogonal direction Y). The columnar portion 12 may be formed so as to be extended in the longitudinal direction X, and another fixture mounting structure 100 may be formed in the extended portion.

DESCRIPTION OF THE REFERENCE CHARACTERS 100 fixture mounting structure
1 resin fixture
2 body portion
2H insertion hole portion
2a, 2b main inner wall face
2h insertion hole (long hole)
2K protrusion
2V auxiliary groove
2M inner-side displacement preventing portion
2R fulcrum portion
2F moderation feeling generating portion
3, 3A, 3B placement portion
10 molded member (base member)
12 columnar portion
12a, 12b main outer wall face
12k deformable rib (projection, tilted projection)
12N outer-side displacement preventing portion
12R terminating protrusion
300 long member (counterpart component)
R, R', R1, R2 fulcrum
X longitudinal direction (orthogonal direction)
Y transverse direction (orthogonal direction)
Z protruding direction (height direction)

What is claimed is:

1. A fixture mounting structure for mounting a resin fixture for holding a counterpart component such as a wire harness, to a molded member such as an instrument panel, wherein
the resin fixture includes
a body portion having a predetermined height in a protruding direction of a columnar portion, the body portion including an insertion hole portion in which a long hole having a rectangular cross-section, an ellipsoidal cross-section, or the like is formed along the protruding direction, in order to insert the columnar portion which is formed in a plate-like shape and which protrudes from a surface of the molded member, and
a placement portion disposed adjacent to the body portion on one side in a transverse direction of the long hole at a termination side in the protruding direction of the body portion, the placement portion being integrated with the body portion, having a thickness less than a height of the body portion, and allowing the counterpart component to be placed on the placement portion,
in an insertion hole portion of the body portion, a protrusion that engages with the columnar portion of the molded member is formed on a main inner wall face on a side on which the placement portion is disposed, among two inner wall faces opposing each other in the transverse direction, and the protrusion protrudes toward a main outer wall face, of the columnar portion, opposing the main inner wall face, and
the main outer wall face of the columnar portion has one or more deformable ribs projecting toward the main inner wall face of the insertion hole portion,
in a mounted state where the insertion hole portion of the body portion is engaged with the columnar portion of the molded member, when an external force acts on the placement portion in the protruding direction, a biting phenomenon in which the protrusion of the main inner wall face is pressed onto the deformable rib of the main outer wall face is caused in the body portion based on a moment in which a fulcrum is a start end side, in the protruding direction, which is an opposite side to the placement portion side, and the deformable rib is deformed due to the protrusion being pressed onto the deformable rib in the mounted state, to prevent the insertion hole portion of the body portion from being disengaged from the columnar portion of the molded member.

2. The fixture mounting structure according to claim 1, wherein the protrusion is disposed in the insertion hole portion on a start end side in the protruding direction.

3. The fixture mounting structure according to claim 1, wherein one or more auxiliary grooves that fit to deformable ribs formed on the main outer wall face of the columnar portion so as to project are formed in the main inner wall face of the insertion hole portion along the protruding direction.

4. The fixture mounting structure according to claim 1, wherein the protrusion is formed so as to protrude from the main inner wall face toward the deformable rib such that the biting phenomenon in which the protrusion is pressed onto the deformable rib formed on the main outer wall face of the columnar portion so as to project is caused.

5. The fixture mounting structure according to claim 4, wherein an inner-side displacement preventing portion that adjacently opposes or comes into contact with the deformable rib in a longitudinal direction of the long hole is formed on the main inner wall face of the insertion hole portion.

6. The fixture mounting structure according to claim 1, wherein a lateral outer wall face positioned in a longitudinal direction of the long hole among outer wall faces of the body portion adjacently opposes or comes into contact with an outer-side displacement preventing portion formed on the main outer wall face of the columnar portion so as to protrude, in the longitudinal direction.

7. A fixture mounting structure for mounting a resin fixture for holding a counterpart component such as a wire harness, to a molded member such as an instrument panel, wherein
the resin fixture includes
a body portion having a predetermined height in a protruding direction of a columnar portion, the body portion including an insertion hole portion in which a long hole having a rectangular cross-section, an ellipsoidal cross-section, or the like is formed along the protruding direction, in order to insert the columnar portion which is formed in a plate-like shape and which protrudes from a surface of the molded member, and
a placement portion disposed adjacent to the body portion on one side in a transverse direction of the long hole at a termination side in the protruding direction of the body portion, the placement portion being integrated with the body portion, having a thickness less than a height of the body portion, and allowing the counterpart component to be placed on the placement portion,
in an insertion hole portion of the body portion, a protrusion that engages with the columnar portion of the molded member is formed on a main inner wall face on a side on which the placement portion is disposed, among two inner wall faces opposing each other in the transverse direction, and the protrusion protrudes toward a main outer wall face, of the columnar portion, opposing the main inner wall face, and
in a mounted state where the insertion hole portion of the body portion is engaged with the columnar portion of the molded member, when an external force acts on the placement portion in the protruding direction, a biting phenomenon in which the protrusion of the main inner wall face is pressed onto the main outer wall face is caused in the body portion based on a moment in which a fulcrum is a start end side, in the protruding direction, which is an opposite side to the placement portion side, to prevent the insertion hole portion of the body portion from being disengaged from the columnar portion of the molded member, and
the protrusion is formed so as to protrude and extend in a longitudinal direction on the main inner wall face such that the biting phenomenon occurs in a tilted projection that projects on the columnar portion and extends so as to be tilted relative to the protruding direction toward the longitudinal direction of the long hole.

8. The fixture mounting structure according to claim 7, wherein the body portion has a fulcrum portion that comes into contact with a terminating protrusion protruding in the protruding direction from a terminating end in the protruding direction of the columnar portion of the molded member, on one side in the longitudinal direction, and another side portion of the resin fixture in the longitudinal direction is rotated toward a start end side in the protruding direction in a tilted state where a contact state is maintained, to insert the columnar portion in the insertion hole portion and obtain the mounted state.

9. The fixture mounting structure according to claim 7, wherein the body portion has a moderation feeling generating portion formed on the main inner wall face so as to protrude, and the moderation feeling generating portion generates insertion moderation feeling by moving over the tilted projection, at a position immediately preceding a position at which insertion is completed, when the columnar portion is inserted in the insertion hole portion.

10. The fixture mounting structure according to claim 1, wherein
the placement portion is formed on each of a first side and a second side that is opposite to the first side in the transverse direction relative to the body portion on a termination side in the protruding direction of the body portion, and
the columnar portion is formed so as to cause the biting phenomenon corresponding to the placement portion disposed on each of the first side and the second side that is opposite to the first side in the transverse direction.

11. A resin fixture for mounting a counterpart component such as a wire harness, to a molded member such as an instrument panel, wherein
the resin fixture includes
a body portion having a predetermined height in a protruding direction of a columnar portion, the body portion including an insertion hole portion in which a long hole having a rectangular cross-section, an ellipsoidal cross-section, or the like is formed along the protruding direction, in order to insert the columnar portion which is formed in a plate-like shape and which protrudes from a surface of the molded member, and
a placement portion disposed adjacent to the body portion on one side in a transverse direction of the long hole at a termination side in the protruding direction of the body portion, the placement portion being integrated with the body portion, having a thickness less than a height of the body portion, and allowing the counterpart component to be placed on the placement portion,
in an insertion hole portion of the body portion, a protrusion that engages with the columnar portion of the molded member is formed on a main inner wall face on a side on which the placement portion is disposed, among two inner wall faces opposing each other in the transverse direction, and the protrusion protrudes toward a main outer wall face, of the columnar portion, opposing the main inner wall face, and
the main outer wall face of the columnar portion has one or more deformable ribs projecting toward the main inner wall face of the insertion hole portion,
in a mounted state where the insertion hole portion of the body portion is engaged with the columnar portion of the molded member, when an external force acts on the placement portion in the protruding direction, a biting phenomenon in which the protrusion of the main inner wall face is pressed onto the deformable rib of the main outer wall face is caused in the body portion based on a moment in which a fulcrum is a start end side, in the protruding direction, which is an opposite side to the placement portion side, and the deformable rib is deformed due to the protrusion being pressed onto the deformable rib in the mounted state, to prevent the insertion hole portion of the body portion from being disengaged from the columnar portion of the molded member.

12. A fixture mounting structure for mounting a resin fixture for holding a counterpart component such as a wire harness, to a molded member such as an instrument panel, wherein the resin fixture has hardness higher than a resin material of the molded member, and the resin fixture includes a body portion having a predetermined height in a protruding direction of a columnar portion, the body portion including an insertion hole portion in which a long hole having a rectangular cross-section, an ellipsoidal cross-section, or the like is formed along the protruding direction, in order to insert the columnar portion which is formed in a plate-like shape and which protrudes from a surface of the molded member, and a placement portion disposed adjacent to the body portion on one side in a transverse direction of the long hole at a termination side in the protruding direction of the body portion, the placement portion being integrated with the body portion, having a thickness less than a height of the body portion, and allowing the counterpart component to be placed on the placement portion, in an insertion hole portion of the body portion, a protrusion that engages with the columnar portion of the molded member is formed on a main inner wall face on a side on which the placement portion is disposed, among two inner wall faces opposing each other in the transverse direction, and the protrusion protrudes toward a main outer wall face, of the columnar portion, opposing the main inner wall face, and in a mounted state where the insertion hole portion of the body portion is engaged with the columnar portion of the molded member, when an external force acts on the placement portion in the protruding direction, a biting phenomenon in which the protrusion having hardness higher than the columnar portion is pressed onto the main outer wall face is caused in the body portion based on a moment in which a fulcrum is a start end side, in the protruding direction, which is an opposite side to the placement portion side, to prevent the insertion hole portion of the body portion from being disengaged from the columnar portion of the molded member.

13. The fixture mounting structure according to claim 12, wherein the main outer wall face of the columnar portion has one or more deformable ribs projecting toward the main inner wall face of the insertion hole portion, in a mounted state where the insertion hole portion of the body portion is engaged with the columnar portion of the molded member, when an external force acts on the placement portion in the protruding direction, a biting phenomenon in which the protrusion of the main inner wall face is pressed onto the deformable rib of the main outer wall face is caused in the body portion based on a moment in which a fulcrum is a start end side, in the protruding direction, which is an opposite side to the placement portion side, and the deformable rib is deformed due to the protrusion being pressed onto the deformable rib in the mounted state, to prevent the insertion hole portion of the body portion from being disengaged from the columnar portion of the molded member.

* * * * *